(No Model.) 2 Sheets—Sheet 1.
K. S. BLANCHARD.
FRUIT DRIER.
No. 541,652. Patented June 25, 1895.
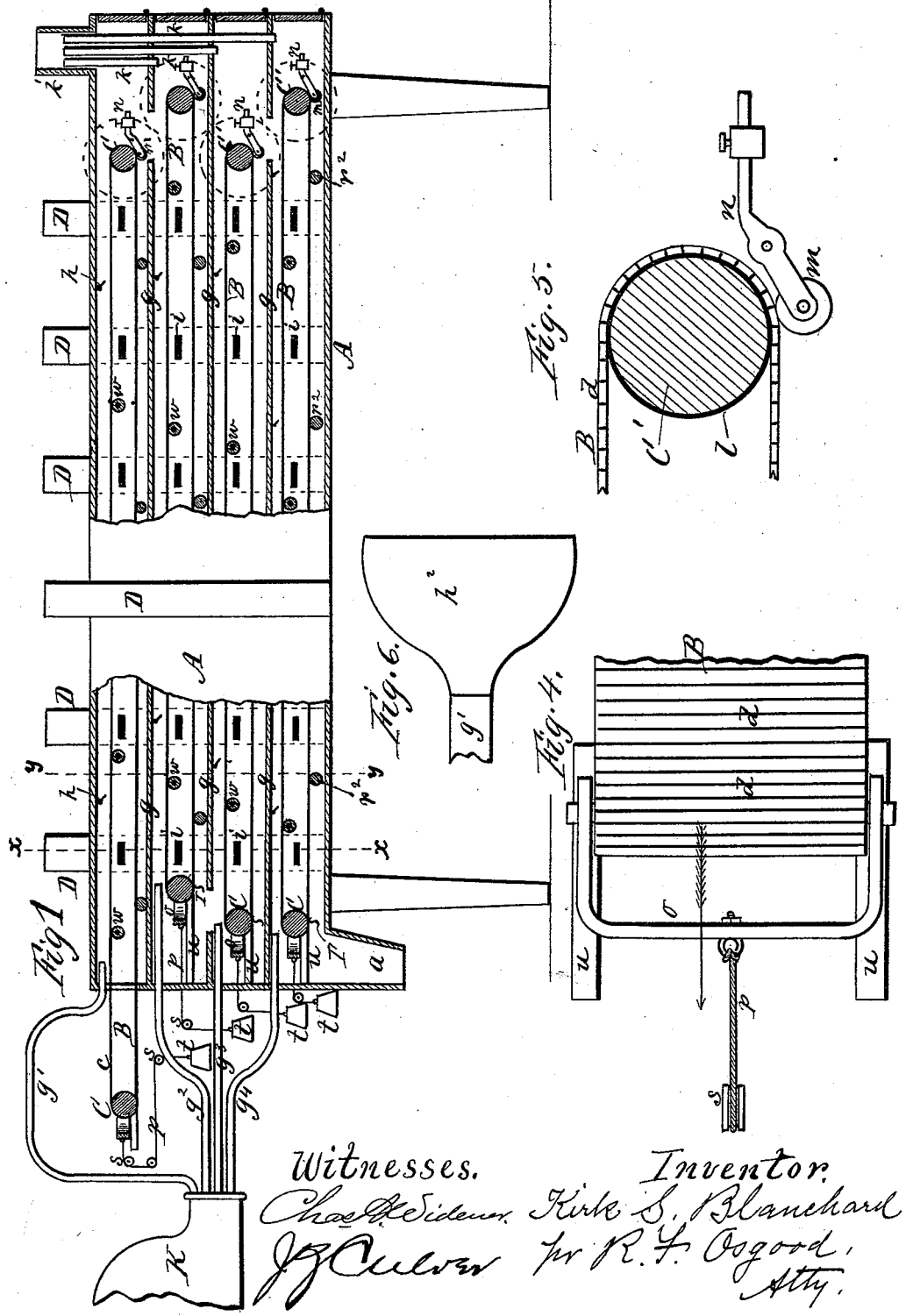
Witnesses.
Chas. H. Sidener.
J. B. Culver.
Inventor.
Kirk S. Blanchard
pr R. F. Osgood.
Atty.

(No Model.) 2 Sheets—Sheet 2.
K. S. BLANCHARD.
FRUIT DRIER.
No. 541,652. Patented June 25, 1895.
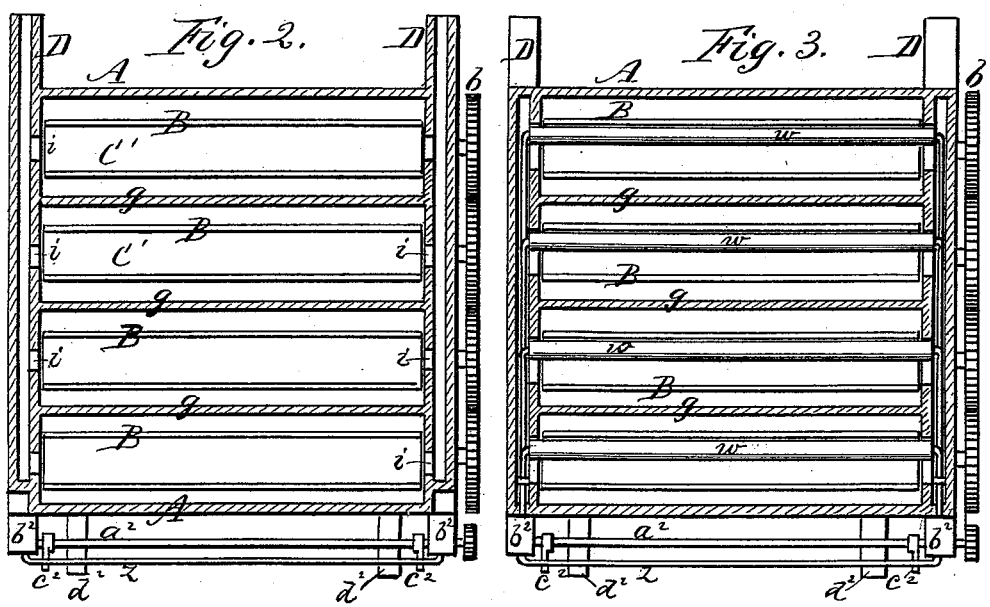
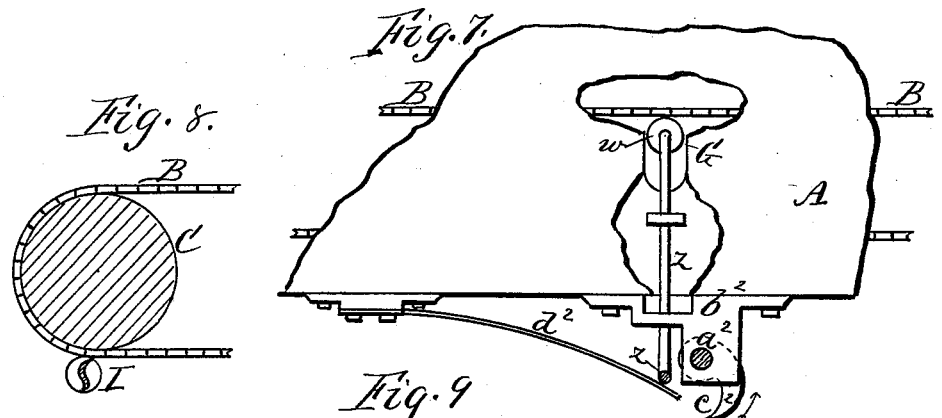
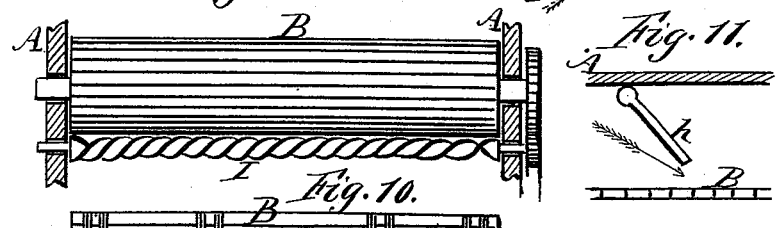
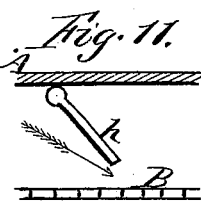
Witnesses.
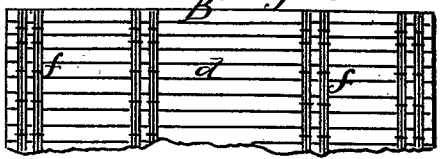
Inventor.
Kirk S. Blanchard,
pr R. H. Osgood,
Atty.

UNITED STATES PATENT OFFICE.

KIRK S. BLANCHARD, OF ALBION, NEW YORK.

FRUIT-DRIER.

SPECIFICATION forming part of Letters Patent No. 541,652, dated June 25, 1895.

Application filed May 22, 1893. Serial No. 475,151. (No model.)

*To all whom it may concern:*

Be it known that I, KIRK S. BLANCHARD, of Albion, in the county of Orleans and State of New York, have invented a certain new and useful Improvement in Fruit-Driers; and I do hereby declare that the following is a full, clear, and exact description of the same, reference being had to the drawings accompanying this application.

My improvement relates to that class of fruit driers in which endless aprons are used one above another on which the fruit is spread, and in which a blast of hot air is blown through the trunk over the aprons, the operation being such that the fruit is dried during the passage and is dropped at the delivery end in a completed condition.

The invention consists in the construction and arrangement of parts hereinafter described and claimed.

In the drawings, Figure 1 is a longitudinal vertical section, partially in elevation, of the apparatus. Figs. 2 and 3 are vertical cross-sections of the same respectively in lines $x$ $x$ and $y$ $y$ of Fig. 1. Fig. 4 is an enlarged plan view of one end of the apron, showing the means for tightening the apron at that end. Fig. 5 is an enlarged vertical cross-section of the apron at the opposite end, showing the means for tightening it at that end. Fig. 6 is an enlarged plan view of the inner end of one of the air-blowing tubes. Fig. 7 is a side elevation of a portion of the casing, showing the means for agitating the fruit on the apron. Fig. 8 is a cross-section showing the means for clearing the apron of refuse. Fig. 9 is an end elevation of Fig. 8. Fig. 10 is a bottom or under side view of a portion of the apron. Fig. 11 is a detail view.

A indicates the casing, which is a long trunk for containing the working parts.

B B B B are the endless aprons or raddles on which the fruit is placed to be dried. As shown in the drawings a series of such aprons is used, one standing above another and offset at the ends, whereby the fruit is dropped from one to another and finally discharged at the spout $a$. The aprons pass around rollers C C', and at one end these rollers are provided with a set of engaging spur gears $b$ $b$ $b$, by which the proper motion is imparted. At one end the upper apron extends out through the casing some distance, as shown at $c$, (Fig. 1,) by which means the fruit can be fed on to the apron from the outside. Each of these aprons consists of a series of lags or slats $d$ $d$ $d$, secured together by means of a series of longitudinal cords $f f$ on the inner side, arranged in sets and stapled in place as shown in Fig. 10. The slats are placed about one-sixteenth of an inch apart, thereby leaving spaces between them through which the moisture raised from the fruit can pass and escape through the ventilating flues as described below.

The casing between the aprons is divided by partitions $g$ $g$ $g$ into separate compartments inclosing the aprons, and so arranged that the hot air entering at one end can pass unobstructedly to the other end. $h$ $h$ are valves located in said compartments above the aprons operated from the outside and standing at a downward incline, whereby the passage of the hot air over the aprons can be checked or retarded at any point.

The sides of the case are made double, with an air space between, as shown in the cross sections, Figs. 2 and 3. At intervals and separated from the air spaces at the sides of the case are vertical ventilating flues D D D, extending from bottom to top and projecting above the top of the case. Openings $i$ $i$ $i$ are made from the interior of the case into these ventilating flues, said openings being between the lengths of the aprons. By this means the moisture is removed at once by the pressure of the hot air on and over the fruit, and perfect ventilation is secured. The openings $i$ $i$ may be covered by valves operated from the outside.

At the rear end of the machine are a set of ventilating tubes $k$ $k$ $k$ (Fig. 1), extending respectively from the several independent compartments up through the top of the casing, and standing at that point in an exterior ventilator $k'$, which exhausts the upper compartment. By this means when the hot air has traversed the whole length of the compartments it has an exit, carrying with it the accumulated moisture which has not been removed by the ventilating flues D D. These tubes $k$ $k$ $k$ may have suitable valves operated from the outside.

The casing is made of considerable length, say fifty feet, more or less, and it is necessary, owing to the considerable weight of the aprons, to provide means by which they can be kept straight or taut at all times. I have provided a peculiar means for the purpose.

The rollers C′ C′, at the farther end of the machine rest on permanent journals or axles, and are provided with the gears $b\ b\ b$ for giving motion. They also have a covering of rubber $l$ at intervals on the periphery, for giving the necessary traction to the aprons. On the under side of each of these rollers is a friction roller $m$, attached to the end of a pivoted weighted arm $n$. The friction roller bears against the outside of the apron and tends to hold it in close contact with the main roller so that proper friction is attained to give motion to the apron. It also tends to hold the apron in contact with the main roller, so that when strain is applied at the opposite or front end of the apron the upper length of the apron will be drawn straight.

At the front end of each apron B a yoke $o$ is attached to the journals of the roller C, and to said yoke is attached a cord $p$, passing over a pulley or pulleys $s$, and provided with a heavy weight $t$. The tendency of the weight is to apply constant tension on the apron and keep it taut and straight. The yoke, or the journals of the roller, rides on ways $u\ u$ at the sides which keeps the apron in the true horizontal position at all times.

By the means above described tension is applied to the upper length of the apron at both ends and the apron never sags. This arrangement is necessary, since, in a casing of considerable length, the apron is heavy, and if any sagging occurs the heat is not brought in proper contact with the top surface and the apron is liable to strike and bind.

G G are a series of agitators for stirring the fruit on the aprons during its passage through the machine. Each of these agitators consists of a roller $w$ extending crosswise under the upper length of the apron and in contact therewith, and a bail $z$ in the form of a loop, on the upper part of which the roller is strung. The lower part of the bail passes under and across the machine as shown.

$a^2$ is a shaft resting in boxes $b^2\ b^2$ and provided with cams $c^2\ c^2$ at such position as to strike the bail $z$ and depress it at every revolution.

$d^2$ is a spring bearing against the bail and forcing the roller $w$ up against the under side of the apron.

At every revolution the cams strike the bail, depressing the roller, then release it, and the spring causes the roller to react and strike the apron with a sharp concussion, by which means the fruit resting on the apron is jarred sufficiently to cause it to change place. This brings all sides of the fruit in position to be acted upon by the hot air. The rollers also assist, in a certain degree, to sustain the apron by being pressed up firmly against it.

I (Figs. 8 and 9), is a clearer located on the under side of the apron where it passes around the roller, designed for clearing off the refuse matter which sticks to the apron, thereby keeping the apron clean. It is a shaft in the form of an auger resting in close contact with the apron, and receiving motion by any suitable means. Being of spiral form it has a drawing contact with the apron, and is much more effective than a scraper. In fact a scraper could not be used without catching the slats.

The hot air is supplied from a blower K of any ordinary construction. From the discharge spout of this blower pipes $g'\ g^2\ g^3\ g^4$ radiate to the various compartments of the machine, and enter directly above the induction ends of the aprons. The ends of the pipes resting over the aprons are connected with a broad and thin mouth piece $h^2$ shown in Fig. 6. This mouth piece occupies nearly or all the width of the apron, and is so thin that the air is blown in, in a thin sheet over the whole surface. By this means it is distributed as soon as it enters, and is in the best condition to do the work. The pipe $g'$, which enters the upper compartment, is curved in the form of an arch as shown, so as to give room to the operator to feed the fruit on to the upper apron.

$r^2\ r^2$ are small rollers under each apron for sustaining and holding same up and preventing it from dragging on the under side of the compartment. In a long apron such as is used in this machine such rollers are necessary.

Having described my invention, I do not claim an endless apron, nor do I claim simply and broadly a series of such aprons with offset ends for dropping the material from one apron to another.

What I claim as new, and desire to secure by Letters Patent, is—

1. In a fruit drier, the combination with the casing A having double sides with an air space between; of a series of endless aprons B B B B located in the casing one above another, a corresponding series of partitions $g\ g\ g$ between the aprons forming separate compartments, ventilating openings through the inner walls of the casing between the lengths of the aprons, and upright ventilators D D D with which the several openings connect, said ventilators being independent of the air space in the sides of the casing, as and for the purpose set forth.

2. In a fruit drier, the combination, with the casing A, having an air space between its sides, of a series of endless aprons B B B, one above another, located therein, a corresponding series of partitions $g\ g\ g$ between the aprons forming separate compartments inclosing the aprons, ventilating openings through the inner sides of the casing between the lengths of the aprons, ventilators D D D with which the openings connect, and ventilating tubes $k\, k\, k\, k'$ at the farther end of the compartments, connecting respectively therewith and extending outward, said ventilating tubes serving to discharge such moisture as escapes past the ventilating openings, as herein shown and described.

In witness whereof I have hereunto signed my name in the presence of two subscribing witnesses.

K. S. BLANCHARD.

Witnesses:
R. F. OSGOOD,
CHAS. A. WIDENER.